Patented Feb. 26, 1929.

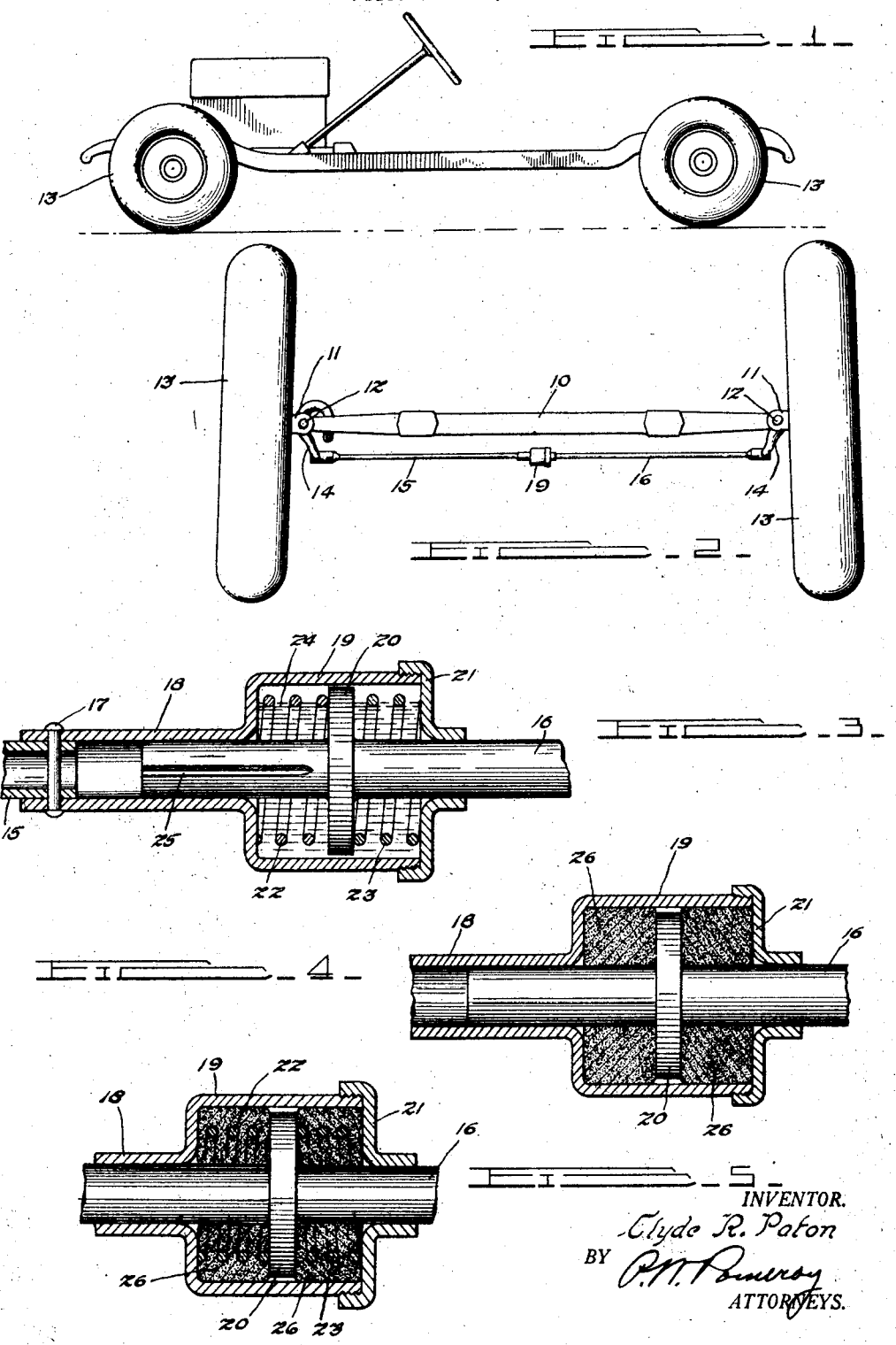

1,703,592

UNITED STATES PATENT OFFICE.

CLYDE R. PATON, OF SOUTH BEND, INDIANA, ASSIGNOR TO THE STUDEBAKER CORPORATION, OF SOUTH BEND, INDIANA, A CORPORATION OF NEW JERSEY.

AUTOMOBILE CONSTRUCTION.

Application filed January 22, 1927. Serial No. 162,783.

This invention relates to automobiles and has for its principal object the provision of means for preventing shimmying thereof.

Another object is to provide, in combination with a motor vehicle, means for preventing the forces tending to cause shimmying of one of the steering wheels thereof from being directly transmitted to the other steering wheel thereof.

Another object is to provide means for connecting the steering wheels of a motor vehicle for relative movement, wherein the forces tending to cause shimmying of one of said steering wheels will be dampened before the same are transmitted to the other of the steering wheels.

Another object is to provide a dampening means in the connection between the steering wheels of a motor vehicle to prevent the transfer of energy from one of the steering wheels to the other wheel thereof.

Another object is to provide a dampening means in the connection between the steering wheels of a motor vehicle whereby such wheels will be prevented from vibrating at the same frequency.

Another object is to provide, in combination with a motor vehicle, a steering cross tube comprising a plurality of parts resiliently constrained for relative movement with each other.

Another object is to provide, in combination with a motor vehicle, a steering cross tube comprising a plurality of parts connected together by resilient means whereby one of said parts is capable of movement relative to another of said parts within restricted limits.

Another object is to provide, in combination with a motor vehicle, a steering cross tube comprising a plurality of parts slidably engaging each other and urged for equal movement by resilient means co-operating therewith.

A further object is to provide, in combination with a motor vehicle, a steering cross tube comprising a pair of sections one of which is provided with a housing, the other of said sections being slidably received within said housing and being provided with a stop member within said housing, resilient dampening means being provided between said stop member and the ends of said housing whereby said sections will be urged toward equal movement with each other.

The above being among the objects of the present invention, the same consists of certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Figure 1 is a side view of an automobile chassis in which a suitable embodiment of the present invention is incorporated.

Figure 2 is a plan view of the front axle and front wheels of the motor vehicle shown in Figure 1, the wheels thereof being connected for relative movement with each other by a cross tube embodying the present invention.

Figure 3 is an enlarged fragmentary sectional view taken centrally through the center of the cross tube shown in Figure 2.

Figure 4 is a view corresponding to Figure 3 illustrating a slightly modified form of construction.

Figure 5 is a view illustrating a still different modification of the construction shown in Figure 3.

In motor vehicles subject to shimmying, I have found that the shimmying movement is caused, at least to some extent, by certain forces acting upon one of the steering wheels thereof, which movement is transmitted to the other steering wheel in which forces are present and occur at the same frequency as those in the first-mentioned steering wheel. The forces described acting in combination and at the same frequency are such that they aid each other in building up to such an extent that they cause those violent vibratory movements of the motor vehicle commonly known as shimmy. These forces are transmitted directly from one wheel to the other through the relatively unyielding cross tube such as is used in conventional constructions. The forces alternately transmitted between the wheels by means of this cross tube tend to maintain the angular relationship of the wheels so that energy is imparted to them from the road, which energy maintains the shimmy movement at considerable amplitude. In many cases the resulting force builds up to such a great extent that it causes a violent vibratory movement of the whole front end of the motor vehicle. I have found that if the forces tending to cause such movement in one of the steering wheels are prevented from combining with similar forces in the other of said steering wheels, substantially no apparent shimmy will occur. It has been suggested as a remedy for this evil that a construction be provided in which no cross tube is used for causing relative movement of the steering wheels, but as this necessitates the use of a separate steering gear for each of the steering wheels, the resulting cost and complications of construction make its use prohibitory with the greater number of manufacturers. In the present invention, I provide a construction which substantially accomplishes this result with but very little increase in the cost of the motor vehicle of which it forms a part, and the construction which I provide, if properly adapted to the vehicle of which it forms a part, is such that substantially no apparent shimmying of the vehicle occurs. I do this by providing a cross tube of such a construction that the forces acting in one of the steering wheels are dampened out in the cross tube and are prevented from being transmitted to the other wheel with sufficient force to have any substantial effect thereon.

In accordance with the present invention, I show a suitable embodiment thereof in the accompanying drawing which shows a motor vehicle having a front axle 10 to the ends of which the steering knuckles 11 are pivotally secured by the king pins 12. Each knuckle 11 rotatably carries an adjacent wheel 13 and is provided with the usual rearwardly extending arm 14, which arms are connected by the usual ball and socket joints to the cross tube which embodies the present invention and which is employed for causing relative movement of the two wheels 13. The cross tube is made up of two main parts 15 and 16, co-axial with each other, and the ends of which lie in adjacent but spaced relationship as indicated in Figure 3. To the end of the portion 15 is secured by suitable means, such as rivets 17, a housing member comprising a tubular neck portion 18 of sufficient inside diameter to slidably receive the inner end of the portion 15, and an expanded end or housing portion 19. The inner end of the rod 16 is slidably received within the neck 18 and has formed thereon within the expanded portion 19 a peripheral flange or stop 20, the outer edges of which are in adjacent but spaced relationship in respect to the inner walls of the portion 19. A cap 21 slidably engaging the portion 16 and forming a bearing therefor, is threadably secured to the open end of the expanded portion 19 and forms a cover or cap therefor.

Within the expanded portion 19 and encircling the portion 16 is a coil spring 22 held in partially compressed state between the stop 20 and the end face of the portion 19, and a similar spring 23 is positioned between the stop 20 and the cap 21. It will thus be seen that although the portions 15 and 16 are slidable with respect to each other, the springs 22 and 23 tend to cause the same to move in unison. The springs 22 and 23 are so proportioned as to allow endwise or axial movement of the portions 15 and 16 with respect to each other upon the relatively small movement of the wheel 13 caused by the forces which tend to cause shimmying, but are such as to cause a relatively equal axial movement of the parts 15 and 16 upon the greater movement of the wheels 13 necessary to control the direction of movement of the vehicle, it being understood that under normal conditions the springs 22 and 23 constrain the wheels 13 to relatively equal movement with each other. When, however, the wheels 13 are acted upon by gyroscopic or other forces which, when combined in phase in both wheels, cause shimmying, the forces in one of the wheels 13 in attempting to be transmitted to the other of the wheels through axial movement of either of the parts 15 and 16, will be absorbed by the springs 22 and 23 with the result that the force will not be transmitted to the other wheel 13, or at least to such a small extent that the effect thereof will be negligible. In this manner the forces in one of the wheels 13 tending to cause shimmying are divorced from the forces in the other wheel 13 and these forces are thereby prevented from combining and building up to a sufficient extent to cause those violent vibratory movements known as shimmying.

In some cases it may be desirable in order to prevent any possibility of the natural period of axial vibration of the cross rod, due to the inclusion of the springs 22 and 23, from coming in phase with the forces tending to cause movement of the wheels 13, which would then synchronize with each other and cause a more serious combination of forces tending to cause shimmying, to make the expanded portion 19 fluid-tight and enclose therein a fluid such as 24 for further dampening relative axial movement between the portions 15 and 16. In such cases it is desirable that the clearance between the outer edges of the stop 20 and the inner face of the expanded portion 19 be relatively close so that a substantial resistance is offered to the passage of the fluid 24 from one side of the stop 20 to the other side thereof, in which case such resistance will tend to dissipate the energy which one of the parts 15 and 16 is attempting to transfer to the other thereof. In case such fluid as described is employed, it is necessary to have some means such as the groove 25 in the end of the portion 16 for allowing free passage of the fluid from within the neck portion 18, between the ends of the portions 15 and 16, to be freely transmitted to the enlarged portion 19.

As a modification of the construction shown in Figure 3, I show in Figure 4 a similar construction except that no springs such as 22 and 23 are employed, their place being taken instead by resilient blocks of rubber or other resilient material such as 26 which serves the same purpose. In addition, the natural internal resistance of the formation of the rubber blocks 26 will serve to a certain extent the same purpose as the fluid 24 in the construction shown in Figure 3. It may be found desirable in some cases to combine both of the constructions shown in Figures 3 and 4, in which case the springs 22 and 23 may be moulded within the rubber blocks 26 to effect a construction as indicated in Figure 5, in which the advantages of both of the other constructions shown will be combined.

Formal changes may be made in the specific embodiment of the invention described without departing from the spirit or substance of the broad invention, the scope of which is commensurate with the appended claims.

What I claim is:

1. In a motor vehicle, means to dampen the shimmying movement of the steering road wheels thereof comprising, a cross member formed of a plurality of sections connecting said wheels, one of said sections being provided with an enlarged end, the other section having its free end slidably received in said first section beyond the enlarged end thereof and having a flange received in said enlarged end, resilient means positioned on opposite sides of said flange and contacting with the end faces of said enlarged end portion for dampening the transfer of vibratory impulses from one section to the other section and means for dampening said resilient means.

2. In a motor vehicle, means to dampen the shimmying movement of the steering road wheels thereof comprising, a cross tube connecting said wheels, said tube being formed of a pair of sections, one of which is provided with a housing, the other of said sections being slidably received within said housing with its free end slidably supported by said first section beyond said housing and having a stop within said housing, spring means interposed between said stop and the ends of said housing, and means for dampening the natural vibratory movement of one of said sections in respect to the other section.

3. In a motor vehicle, means to dampen the shimmying movement of the steering road wheels thereof comprising, a cross tube formed of a plurality of sections connecting said wheels, one of said sections having a tubular portion and an enlarged end portion, the other of said sections having its free end slidably supported in said tubular portion and having a stop positioned in said enlarged portion, resilient means positioned on opposite sides of said stop and contacting with the ends of said enlarged portion to normally constrain said sections for equal axial movement with each other and a fluid in said enlarged portion to dampen the transfer of vibratory impulses from one section to the other section.

Signed by me at South Bend, Indiana, this 20th day of January, 1927.

CLYDE R. PATON.